(12) United States Patent
Caruso

(10) Patent No.: US 11,950,608 B2
(45) Date of Patent: Apr. 9, 2024

(54) CASED PROTEIN PRODUCT

(71) Applicant: Joseph Edward Caruso, Havre de Grace, MD (US)

(72) Inventor: Joseph Edward Caruso, Havre de Grace, MD (US)

( * ) Notice: Subject to any disclaimer, the term of this patent is extended or adjusted under 35 U.S.C. 154(b) by 0 days.

(21) Appl. No.: 17/696,655

(22) Filed: Mar. 16, 2022

(65) Prior Publication Data

US 2023/0292790 A1    Sep. 21, 2023

(51) Int. Cl.
| | |
|---|---|
| *A23J 3/22* | (2006.01) |
| *A23J 3/04* | (2006.01) |
| *A23L 13/00* | (2016.01) |
| *A23L 29/212* | (2016.01) |

(52) U.S. Cl.
CPC ............... *A23J 3/227* (2013.01); *A23J 3/04* (2013.01); *A23L 13/03* (2016.08); *A23L 29/212* (2016.08); *A23V 2002/00* (2013.01)

(58) Field of Classification Search
CPC ... A23J 3/227; A23J 3/04; A23L 13/03; A23L 29/212
See application file for complete search history.

(56) References Cited

U.S. PATENT DOCUMENTS

| | | | | |
|---|---|---|---|---|
| 5,445,562 A | * | 8/1995 | Brunell | A22C 7/0046 100/283 |
| 2013/0034635 A1 | * | 2/2013 | Newberry | A23L 7/13 426/421 |

| | | | |
|---|---|---|---|
| 2020/0060299 A1 | | 2/2020 | Pettinelli |
| 2021/0186052 A1 | | 6/2021 | Witteveen et al. |
| 2021/0298325 A1 | | 9/2021 | Snodgrass, Jr. et al. |

FOREIGN PATENT DOCUMENTS

| | | |
|---|---|---|
| CN | 112841396 A | 5/2021 |
| KR | 2002-0093744 A | 12/2002 |

OTHER PUBLICATIONS

"Breaded Chicken Wings" Apr. 18, 2011 https://www.tasteofhome.com/recipes/breaded-chicken-wings/ (Year: 2011).*
"Vegan Fried Chicken with Tofu Skin Recipe" Nov. 24, 2021 https://www.theedgyveg.com/2021/10/26/vegan-fried-chicken-with-tofu-skin/ (Year: 2021).*
Ko, Genevieve. Sep. 18, 2015 "Everything You Need to Know About Chicken Wings" https://web.archive.org/web/20150918231035/ https://www.epicurious.com/archive/howtocook/dishes/chicken-wings (Year: 2015).*
Gretler, Corinne. "California-made fake chicken has 'skin' and 'bones' -and Nestle is investing" OC Register Nov. 19, 2021. (Year: 2021).*

* cited by examiner

*Primary Examiner* — Katherine D Leblanc
(74) *Attorney, Agent, or Firm* — Akerman LLP

(57) ABSTRACT

A foodstuff may include an edible encased protein product. The edible encased protein product may include a natural or synthetic edible casing and a full muscle chicken protein filler encased in the casing. An insertion member may extends along a longitudinal axis between first and second ends. At least one end may extend within the full muscle chicken encased in the casing. The edible encased protein may be dimensioned to simulate a chicken wing flat or drumette.

17 Claims, 3 Drawing Sheets

CASED PROTEIN PRODUCT

TECHNICAL FIELD

The present application is directed to a cased protein product that is an alternative to natural chicken wings.

BACKGROUND

The supply for natural chicken wings has decreased recently, and thereby increasing the cost of natural chicken wings. What is needed is a new solution for chicken wings.

SUMMARY

In one aspect, a protein product includes a casing, a protein filler encased in the casing, and an insertion member. The insertion member may extend along a longitudinal axis between first and second ends. At least one of the ends may extend within the protein filler encased in the casing. The casing together with the encased protein filler of the protein product may be dimensioned to simulate a natural protein product.

In one example, the casing comprises a natural or synthetic casing.

In some examples, the casing may be perforated. In these or other examples, the casing may be smooth and/or non-perorated in whole or in-part.

In various examples, the casing may be coated with a flavored or unflavored starch.

In some examples, the protein filler comprises one of full muscle chicken, pork, beef, or plant based meat alternatives.

In one example, the casing together with the encased protein filler of the protein product includes a diameter of approximately 32-38 mm.

In some examples, the insertion member is shaped and dimensioned to simulate a bone associated with the simulated natural protein product.

In one example, the insertion member comprises a thermo-resistant plastic.

In various examples, the casing may be configured to be baked or fried.

In another aspect, a foodstuff may include an edible encased protein product. The edible encased protein product may include a natural or synthetic edible casing and a full muscle chicken protein filler encased in the casing. An insertion member may extends along a longitudinal axis between first and second ends. At least one end may extend within the full muscle chicken encased in the casing. The edible encased protein may be dimensioned to simulate a chicken wing flat or drumette.

In one example, the insertion member may be shaped to simulate a natural chicken wing or drumette bone that corresponds to the respective chicken wing or drumette simulated by the edible encased protein product.

In some examples, the insertion member may be dimensioned to simulate the respective natural chicken wing or drumette.

In various examples, the casing is perforated. In another example, the casing is smooth and non-perforated.

In some examples, the casing may be coated with a flavored or unflavored starch.

In one example, the edible encased protein product comprises a diameter of approximately 32-38 mm.

In various examples, the casing is configured to be fried or baked.

In some examples, the casing is infused with flavoring.

In one example, the insertion member comprises a thermo-resistant plastic.

BRIEF DESCRIPTION OF THE DRAWINGS

Novel features of the present invention are set forth with particularity in the appended claims. However, the various embodiments of the present invention described herein, both as to organization and manner of operation, may be best understood by reference to the following description, taken in conjunction with the accompanying drawings in which:

DESCRIPTION

Figure 1:
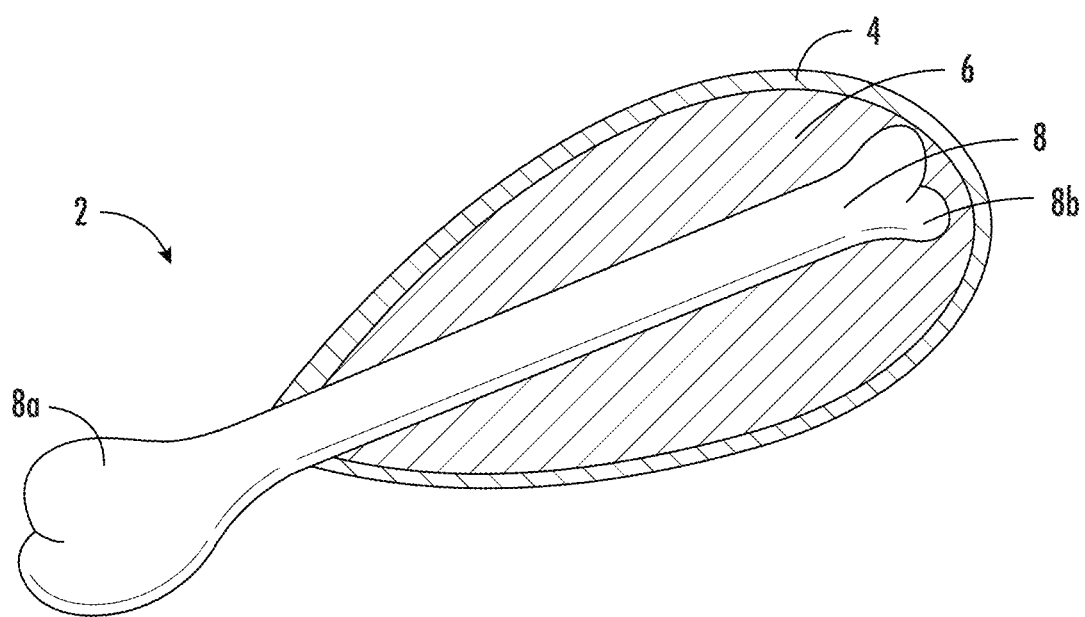
FIG. 1 is a cross-section view of a cased protein product drumette according to one embodiment.

The present disclosure describes various embodiments of a protein product encased in a natural or synthetic casing. The cased protein product may include various protein fillers, such as white, dark, and/or full muscle chicken meat. The natural or synthetic casing may simulate natural meat products such as chicken wings, thereby providing greater sourcing capabilities for such meat products, which may be particularly beneficial in situations of wing shortages. Such cased protein products may also beneficially include healthier meat choices than their natural counterpart or may additionally or alternatively include plant-based protein. Further benefits include the ability to provide improved and different flavors of protein products in recognizable forms to provide new and improved eating experiences.

FIGS. 1-5 illustrate cross-sections of a cased protein product 2 according to various embodiments, wherein like features are identified by like numbers. A cased protein product 2 may comprise a natural or man-made edible casing 4, such as a sausage casing, that provides an outer skin casing 4 for an cased protein filler 6 that simulates a natural skin consistency, such as that of a chicken wing, for improved mouthfeel and snap.

The cased protein product 2 may utilize various casing 4 materials. For example, casings 4 may include natural casings such as those derived from sheep, pigs, cattle, goats, or horses. Natural casing will typically be derived from intestinal submucosa; however, in some embodiments, other natural casings may be utilized. In various embodiments, the cased protein product 2 may utilize synthetic or artificial casings 4. For example, casings 4 may be made from collagen, gelatin, alginate, whey protein, casein, or other suitable material. In one configuration, the collagen may be sourced from poultry. Some casing 4 embodiments may comprise or consist of non-animal materials or plant-based materials such as starch, zein, vegetable glycerin, soy protein, gluten, or polysaccharides. Plant-based materials may be used to form vegetarian or vegan casings, for example, or may be used together with animal-based or other synthetic materials.

Casings 4 may be flavored or unflavored. For example, casings 4 may be smoked, spiced, peppered, or caramelized. In one example, casings 4 may be flavored with Cajun, jerk, Italian, ranch, blue cheese, or teriyaki flavoring. In an above or another example, casings 4 may be meat flavored to better simulate the corresponding natural flavor. For instance, casings 4 for chicken wings may be flavored, e.g., infused, with chicken flavor. The above or other flavorings may be dry or liquid. Flavoring may be positioned or lined along an interior or exterior surface of the casing 4. In some applications, casings 4 may be impregnated or infused with flavoring. In another variation, casings 4 may include a flavor lining wherein the flavoring is positioned within a pocket or between a first and second layer of the casing 4. In some embodiments, flavored or unflavored casings may incorporate or be coated with starch to add a crisp bite and act as a capture medium to enhance adherence of sauces. In one example, the starch may be flavored, which may include a flavor identified herein or any other suitable flavor.

The casing 4 can be smooth, non-perforated, or perforated to enhance the type of bite and tear when consumed. Perforations may be formed in the casing 4 prior to or after filling with protein filler 6. The casing 4 is preferably configured to withstand cooking temperatures without significant structural breakdown. Casings 4 of various thicknesses may be used to provide desired feel. For example, some embodiments may utilize casings 4 having a thickness between 0.005 mm and 0.15 mm, such as greater than 0.01 mm, 0.05, or 0.1 mm or less than 0.1 mm or 0.05 mm.

As introduced above, casing 4 may be filled with a protein filler 6, such as full muscle or formed chicken, other poultry, pork, beef or plant based meat alternatives. The protein filler 6 may be unflavored or flavored and encased in a flavored or unflavored casing 4. In some embodiments, the protein filler 6 itself may include flavoring, which may be in addition to the natural flavoring of the protein filler 6. In one example, animal fat may be added to the protein filler 6. For instance, chicken fat may be added to a protein filler 6 comprising brown or white chicken meat or another protein filler 6 to enhance its flavoring. Protein filler 6 may be smoked, peppered, or caramelized. Protein filler may be marinaded or infused with flavoring such as BBQ, teriyaki, Cajun, sweet, sweet and sour, sweet and hot, beer, whiskey, or other medium. Additionally or alternatively, protein filler 6 may be spiced, e.g., with ranch, blue cheese, jerk, Cajun, Italian, or other spices.

The protein filler may be loose, sectioned, or molded into any desired shape. For example, according to some embodiments, protein filler 6 may be pre-shaped into cubes, balls, or nuggets. In some applications, casing 4 may be pre-shaped and dimensioned such that protein filler 6 fits within casing 4 to provide a desired shape. For instance, casing 4 may be provided to define various shapes and cross-section shapes when encasing the protein filler 6.

Figure 5:
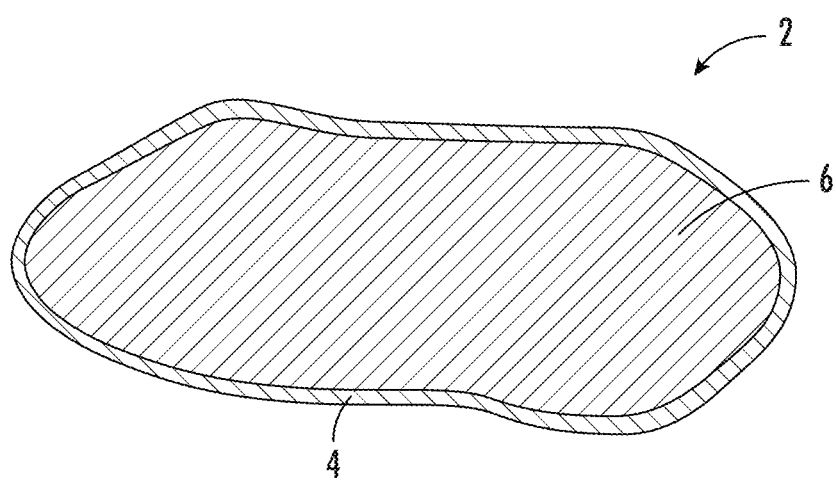
FIG. 5 is a cross-section view of a cased protein product according to one embodiment.

As introduced above, the protein filler 6 may be molded or pressed into various shapes, such as a flat or drumette chicken wing portion, and/or casings 4 may be shaped and dimensioned to receive protein filler 6 to provide desired shaped and dimensioned cased protein products 2. For example, the protein filler 6 and/or casing 4 may be dimensioned to simulate a natural protein product 2 such as a chicken wing. Shaping the protein filler 6 may include pressing and forming the protein filler 6 to a desired shape, such as a flat or wing portion. In one example, the protein filler 6 may be shaped by pressing and forming to a desired shape by use of a mold to a frozen or refrigerated state. In various embodiments, a cased protein product 2 in the shapes of flats and drumettes can be filled and pressed to resemble the disjointed, separated tip of chicken wing portions. According to one embodiment of a simulated chicken wing cased protein product 2, the casing 4 with a protein filler 6 may be approximately 10-50 mm in diameter. Preferably, casing 4 with a protein filler 6 is approximately 32-38 mm in diameter. FIG. 5 illustrates an example of a protein product 2 wherein the protein filler 6, such as full chicken muscle meat, is shaped to simulate a chicken wing flat. Protein products 2 may similarly be shaped to simulate a chicken wing drumette. As described in more detail below, the protein filler 6 and/or casing 4 may be shaped to resemble a desired shape and further include an insertion member 8 to further simulate a natural or improved meat product.

Protein filler 6 may be manually inserted into casing 4, or may be inserted by machine. In various embodiments, the protein filler 6 may be supplied into the casing 4 raw or partially cooked and thereafter cooked while in the casing 4. In some embodiments, the protein filler 6 may be supplied into the casing 4 fully cooked. In some embodiments, the protein filler 6 supplied into the casing 4 may be molded to a frozen or refrigerated state.

According to some embodiments, and with particular reference to FIGS. 1-4, the cased protein product 2 may include an insertion member 8. Insertion member 8 can be inserted into the cased protein product 2 or otherwise positioned within or in contact with a protein filler 6 mass encased in the casing 4 to simulate a bone and/or to grasp when eating. The insertion member 8 may be a flat, rounded, or shaped rod or bar. The insertion member 8 may extend along a longitudinal axis between a first end 8a and a second end 8b wherein the protein filler 6 positions around all or a portion of the insertion member. The insertion member 8 may be constructed of a food safe material, such as polystyrene, and according to some embodiments, can be made of a thermo resistant material. In various embodiments, the cased protein product 2 may include an insertion member 8 shaped to simulate a natural bone on which meat is typically consumed. Such a familiar visual appearance may enhance the eating experience. For example, the cased protein product 2 may be prepared to simulate a chicken wing and include chicken muscle, plant-based protein, or other protein filler 6 encased in a natural or synthetic casing 4. The insertion member 8 may be positioned within the protein filler 6 in a manner to simulate a drumette (see, e.g., FIG. 1) or flat (see, e.g., FIG. 2), wherein the insertion member 8 is shaped to similarly simulate corresponding bones of a natural drumette or flat. The casing 4 may be dimensioned to similarly simulate a natural drumette or flat shape when encasing the protein filler 6 housed on the insertion member 8.

Figure 2:
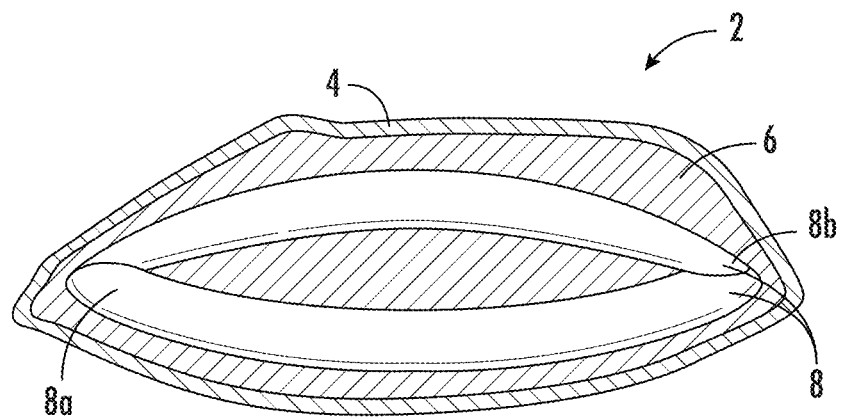
FIG. 2 is a cross-section view of a cased protein product flat according to one embodiment.
Figure 3:
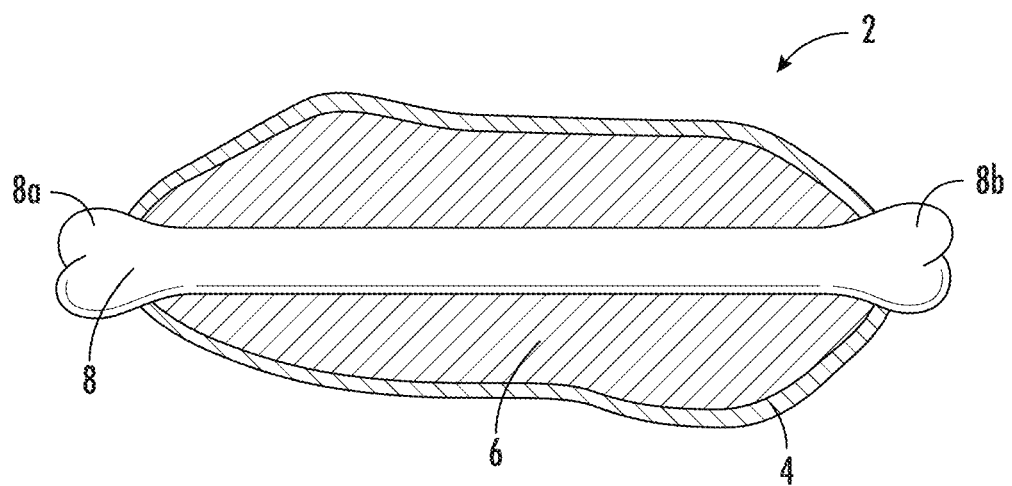
FIG. 3 is a cross-section view of a cased protein product according to one embodiment.

As introduced above, the cased protein product 2 may include a protein filler 6 encased in casing 4 and that may be shaped to simulate a natural animal foodstuff. FIG. 1 illustrates a cross-section of a cased protein product 2 wherein the protein filler 6 and casing 4 conform to a shape of a drumette that when positioned around an insertion member 8 simulate a drumette. The insertion member 8 may be shaped to correspond with a natural drumette bone shape to further enhance the simulation. FIG. 2 illustrates a cross-section of a cased protein product 2 wherein the protein filler 6 and casing 4 conform to a shape of a flat that when positioned around one or more insertion members 8 simulate a flat. The one or more insertion members 8 may be shaped to correspond with a pair of natural flat bones to further enhance the simulation.

Figure 4:
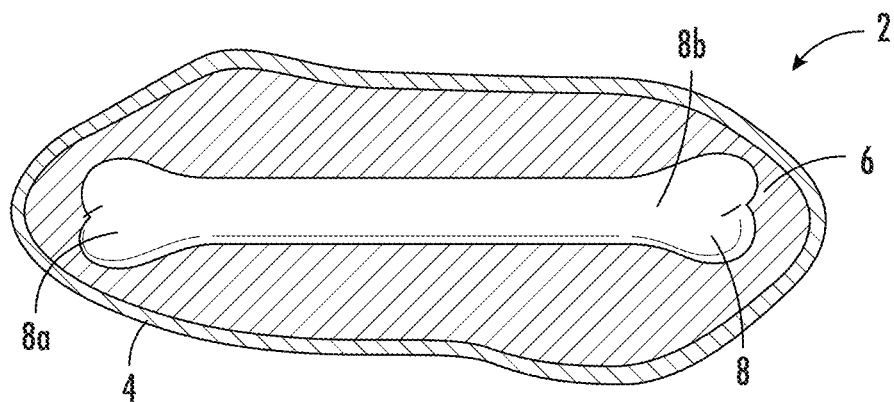
FIG. 4 is a cross-section view of a cased protein product according to one embodiment.

In some embodiments, the encased protein product 2 may simulate an improved natural protein product by providing a more visually appealing shape or an easier to consume design. For example, in the embodiment shown in FIG. 3, ends 8a, 8b of the insertion extend from two sides of the casing 4 encasing the protein filler 6. A user may grasp the ends 8a, 8b of the insertion member 8 while eating the casing 4 and protein filler 6, which may also reduce typical transfer of food material to the user's fingers. The casing 4 and protein filler 6 are shaped to simulate a wing flat shape in the illustrated embodiment, but other shapes may be used, such as a drumette, ball, nugget, or other desired shape. For example, in one embodiment, the cased protein product 2 is similar to that depicted in FIG. 1 but both ends 8a, 8b extend from the insertion member 8. In another embodiment, the encased protein product 2 includes an insertion member 8 wherein both ends 8a, 8b are surrounded by protein filler 6, an example of which is shown in FIG. 4.

The insertion member 8 is preferably resistant to heat damage such that the cased protein product 2 may be baked or fried with the bone shaped insertion member 8 inserted. The insertion member 8 may be present during eating and may be discarded after the meat has been removed from insertion member 8. Various additional insertion member 8 features may also be used. For example, insertion member 8 may include a thermal resistant or thermal conductive portion that underlies the protein filler to aid in achieving optimal cooking temperature and/or degree of cooking of the protein filler throughout one or more portions of the protein filler. In another or a further example, the insertion member 8 may include flavoring along it surface or may include one or more passages through which flavoring may be provided into the insertion member 8 and released through perforations along the surface of the insertion member 8 into the protein filler, such as by boiling of the flavoring or operation of a plunger with respect to the one or more passages.

In some embodiments, the cased protein product 2 does not include an insertion member 8. For example, FIG. 5 illustrates a cross-section of an embodiment wherein the cased protein product 2 includes protein filler 6 and casing 4 that conform to a shape of a flat. As introduced above, other shapes may be used, such as a drumette, without an insertion member.

This disclosure describes various elements, features, aspects, and advantages of various embodiments of the cased protein product 2 and methods thereof. It is to be understood that certain descriptions of the various embodiments have been simplified to illustrate only those elements, features and aspects that are relevant to a more clear understanding of the disclosed embodiments, while eliminating, for purposes of brevity or clarity, other elements, features and aspects.

Any references to "various embodiments," "certain embodiments," "some embodiments," "one embodiment," or "an embodiment" generally means that a particular element, feature and/or aspect described in the embodiment is included in at least one embodiment. The phrases "in various embodiments," "in certain embodiments," "in some embodiments," "in one embodiment," or "in an embodiment" may not refer to the same embodiment. Furthermore, the phrases "in one such embodiment" or "in certain such embodiments," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

What is claimed is:

1. A foodstuff, comprising:
    an edible encased protein product comprising
        a natural or synthetic edible sausage casing;
        a full muscle chicken protein filler encased in the casing; and
    an insertion member that extends along a longitudinal axis between first and second ends, wherein at least one end extends within the full muscle chicken encased in the casing, wherein the edible encased protein is dimensioned to simulate a chicken wing flat or drumette, wherein the insertion member simulates a natural chicken wing flat bone or drumette bone that corresponds to the respective chicken wing flat or drumette simulated by the edible encased protein product, wherein the insertion member comprises a thermo-resistant plastic, and wherein the insertion member is positioned entirely within the full muscle chicken encased in the casing.

2. The foodstuff of claim 1, wherein the insertion member simulates the natural chicken wing flat bone or drumette bone by being shaped to simulate the natural chicken wing flat bone or drumette bone.

3. The foodstuff of claim 2, wherein the insertion member further simulates the natural chicken wing flat bone or drumette bone by being dimensioned to simulate the natural chicken wing flat bone or drumette bone.

4. The foodstuff of claim 3, wherein the casing is perforated.

5. The foodstuff of claim 3, wherein the casing is smooth and non-perforated.

6. The foodstuff of claim 3, wherein the casing is coated with a flavored or unflavored starch.

7. The foodstuff of claim 3, wherein the edible encased protein product comprises a diameter of approximately 32-38 mm.

8. The foodstuff of claim 7, wherein the casing is configured to be fried or baked.

9. The foodstuff of claim 8, wherein the casing is infused with flavoring.

10. A protein product, comprising:
    a natural or synthetic edible sausage casing;
    a protein filler encased in the casing; and
    an insertion member that extends along a longitudinal axis between first and second ends, wherein at least one end extends within the protein filler encased in the casing, wherein the casing together with the encased protein filler of the protein product is dimensioned to simulate a a chicken wing flat or drumette, wherein the insertion member simulates a natural chicken wing flat bone or drumette bone that corresponds to the respective chicken wing flat or drumette simulated by the casing together with the encased protein filler of the protein product, wherein the insertion member comprises a thermo-resistant plastic, and wherein the insertion member is positioned entirely within the protein filler encased in the casing.

11. The protein product of claim 10, wherein the casing is perforated.

12. The protein product of claim 10, wherein the casing is coated with a flavored or unflavored starch.

13. The protein product of claim 10, wherein the protein filler comprises one of full muscle chicken, pork, beef, or plant based meat alternatives.

14. The protein product of claim 10, wherein the casing together with the encased protein filler of the protein product includes a diameter of approximately 32-38 mm.

15. The protein product of claim 10, wherein the casing is configured to be baked or fried.

16. The foodstuff of claim 1, wherein the insertion member includes one or more passages that include flavoring.

17. The foodstuff of claim 16, wherein the insertion member includes one or more perforations on a surface of the insertion member that release the flavoring included in the one or more passages.

\* \* \* \* \*